US009838959B2

(12) United States Patent
Breton (10) Patent No.: US 9,838,959 B2
(45) Date of Patent: Dec. 5, 2017

(54) ENVIRONMENT CONTROL DEVICE (ECD) AND METHOD FOR CONFIGURING THE ECD TO OPERATE A WI-FI COMMUNICATION INTERFACE (71) Applicant: DISTECH CONTROLS INC, Brossard (CA)

(72) Inventor: Danny Breton, Saint-Jean sur Richelieu (CA)

(73) Assignee: DISTECH CONTROLS INC, Brossard (CA)

( * ) Notice: Subject to any disclaimer, the term of this patent is extended or adjusted under 35 U.S.C. 154(b) by 0 days.

(21) Appl. No.: 15/007,302

(22) Filed: Jan. 27, 2016

(65) Prior Publication Data

US 2016/0219502 A1 Jul. 28, 2016

Related U.S. Application Data (60) Provisional application No. 62/108,576, filed on Jan. 28, 2015.

(51) Int. Cl.
H04M 3/00 (2006.01)
H04W 48/18 (2009.01)
H04W 76/02 (2009.01)
H04L 29/12 (2006.01)
H04L 12/741 (2013.01)
H04W 84/12 (2009.01)
(Continued)

(52) U.S. Cl.
CPC ......... H04W 48/18 (2013.01); H04L 61/2015 (2013.01); H04W 76/026 (2013.01); H04L 45/74 (2013.01); H04W 84/12 (2013.01); H04W 84/22 (2013.01); H04W 88/10 (2013.01)

(58) Field of Classification Search
CPC . H04W 8/245; H04W 84/12; H04M 1/72525; H04M 1/72519
USPC ........................ 455/419, 418, 550.1; 370/338
See application file for complete search history.

(56) References Cited

U.S. PATENT DOCUMENTS

2006/0098614 A1* 5/2006 Moon ............... H04L 29/12367
370/338
2010/0121946 A1* 5/2010 Claes .................. H04L 12/5692
709/223
(Continued)

FOREIGN PATENT DOCUMENTS

CA 2863117 A1 11/2014
WO 2014167465 A1 10/2014

Primary Examiner — Danh Le
(74) Attorney, Agent, or Firm — RatnerPrestia (57) ABSTRACT The present disclosure relates to an environment control device (ECD) and a method. The ECD and method comprise a first communication interface, a second communication interface of the Wi-Fi type, and a processing unit. The processing unit sends a DHCP-DISCOVER message via the first communication interface. The processing unit also configures the ECD to operate the second communication interface as a Wi-Fi Access Point if a DHCP-OFFER message is received in response to the DHCP-DISCOVER message via the first communication interface. The processing unit also configures the ECD to operate the second communication interface as a Wi-Fi hotspot if no DHCP-OFFER message is received in response to the DHCP-DISCOVER message via the first communication interface.

20 Claims, 4 Drawing Sheets (51) Int. Cl.
    *H04W 84/22*        (2009.01)
    *H04W 88/10*        (2009.01)

(56) References Cited

U.S. PATENT DOCUMENTS

| | | | |
|---|---|---|---|
| 2011/0046801 A1* | 2/2011 | Imes | H04L 67/10 |
| | | | 700/286 |
| 2011/0190910 A1 | 8/2011 | Lombard et al. | |
| 2012/0014362 A1* | 1/2012 | Inada | H04W 40/22 |
| | | | 370/338 |
| 2014/0244834 A1* | 8/2014 | Guedalia | H04L 67/16 |
| | | | 709/224 |
| 2015/0023183 A1* | 1/2015 | Ilsar | H04W 48/16 |
| | | | 370/244 |
| 2015/0063205 A1* | 3/2015 | Elliott | H04L 61/6022 |
| | | | 370/328 |
| 2016/0014824 A1* | 1/2016 | Xiang | H04W 16/10 |
| | | | 370/329 |
| 2016/0135241 A1* | 5/2016 | Gujral | H04W 76/023 |
| | | | 370/328 |

\* cited by examiner

ENVIRONMENT CONTROL DEVICE (ECD) AND METHOD FOR CONFIGURING THE ECD TO OPERATE A WI-FI COMMUNICATION INTERFACE

TECHNICAL FIELD

The present disclosure relates to the field of environment control systems. More specifically, the present disclosure relates to an environment control device (ECD) and method for configuring the ECD to operate a Wi-Fi communication interface.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances.

Communications between an environment controller and the devices under its control (sensors, controlled appliances, etc.) were traditionally based on wires. The wires are deployed in the building where the environment control system is operating, for instance in the walls, ceilings, and floors of multiple rooms in the building. Deploying wires in a building is usually disrupting for the daily operations in the building and costly. Thus, recently deployed environment controllers and devices under their control (sensors, controlled appliances, etc.) are using the Wi-Fi communication protocol to exchange environmental data.

The environment controller and the devices under its control (sensors, controlled appliances, etc.) are generally referred to as Environment Control Devices (ECDs). A technician installing an environment control system comprising a plurality of ECDS may configure one of the ECDs (e.g. an environment controller) to support either a Wi-Fi Access Point functionality or a Wi-Fi hotspot functionality. The choice between the two functionalities depends on whether the ECD can connect (Access Point mode) or not (hotspot mode) to an existing IP network of the building. A manual configuration of the ECD (either in Access Point or hotspot mode) performed by the technician takes time and is prone to error. Automating this configuration could facilitate the task of the technician and avoid configuration errors.

Therefore, there is a need for a new environment control device (ECD) and method for configuring the ECD to operate a Wi-Fi communication interface.

SUMMARY

According to a first aspect, the present disclosure relates to an environment control device (ECD). The ECD comprises a first communication interface, a second communication interface of the Wi-Fi type, and a processing unit. The processing unit sends a DHCP-DISCOVER message via the first communication interface. The processing unit configures the second communication interface to operate as a Wi-Fi Access Point, if a DHCP-OFFER message is received in response to the DHCP-DISCOVER message via the first communication interface. Alternatively, the processing unit configures the second communication interface to operate as a Wi-Fi hotspot, if no DHCP-OFFER message is received in response to the DHCP-DISCOVER message via the first communication interface.

According to a second aspect, the present disclosure relates to a method for configuring an environment control device (ECD) to operate a Wi-Fi communication interface. The method comprises sending, by a processing unit of the ECD, a DHCP-DISCOVER message via a first communication interface of the ECD. The method comprises configuring the ECD, by the processing unit, to operate a second communication interface of the ECD of the Wi-Fi type as a Wi-Fi Access Point, if a DHCP-OFFER message is received in response to the DHCP-DISCOVER message via the first communication interface. Alternatively, the method comprises configuring the ECD, by the processing unit, to operate the second communication interface as a Wi-Fi hotspot, if no DHCP-OFFER message is received in response to the DHCP-DISCOVER message via the first communication interface.

According to a third aspect, the present disclosure relates to a computer program product comprising instructions deliverable via an electronically readable media, such as storage media and communication links. The instructions, when executed by a processing unit of an environment control device (ECD), provide for configuring the ECD to operate a Wi-Fi communication interface according to the aforementioned method.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to a configuration of an environment control device (ECD) to operate a Wi-Fi communication interface, for exchanging environmental data with other components of an environment control system.

Terminology

The following terminology is used throughout the present disclosure:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Relay: device capable of relaying an environmental characteristic value from a sensor to an environment controller and/or relaying a command from an environment controller to a controlled appliance.

Environmental state: a current condition of an environment based on an environmental characteristic, each environmental state may comprise a range of values or verifiable representation for the corresponding environmental characteristic.

Wi-Fi: any Wireless Local Area Network (WLAN) product that is based on the Institute of Electrical and Electronics Engineers' (IEEE) 802.11 standards.

Wi-Fi Access Point: communication infrastructure allowing communications between devices using communication protocols based on the 802.11 standards. The Wi-Fi Access Point is established by a dedicated device (e.g. a particular ECD such as an environment controller). A device needs to associate with the Wi-Fi Access Point, before being capable of using it for communications with other devices. The Wi-Fi Access Point gives access to an existing Internet Protocol (IP) network, to which the dedicated device establishing the Wi-Fi Access Point is connected via a communication interface.

Wi-Fi hotspot: communication infrastructure allowing communications between devices using communication protocols based on the 802.11 standards. The Wi-Fi hotspot is established by a dedicated device (e.g. a particular ECD such as an environment controller). A device needs to associate with the Wi-Fi hotspot, before being capable of using it for communications with other devices. The Wi-Fi hotspot gives access to an independent IP network (independently of any existing IP network), the dedicated device establishing the Wi-Fi hotspot managing (at least partially) the independent IP network.

DHCP: the Dynamic Host Configuration Protocol used by a computing device implementing a DHCP client to acquire an IP address from a DHCP server.

Referring now concurrently to FIGS. 1, 2, 3 and 4, an environment control device (ECD) 100 (FIGS. 1, 2 and 3) and a method 500 (FIG. 4) for configuring the ECD to operate a Wi-Fi communication interface are illustrated.

Figure 1:
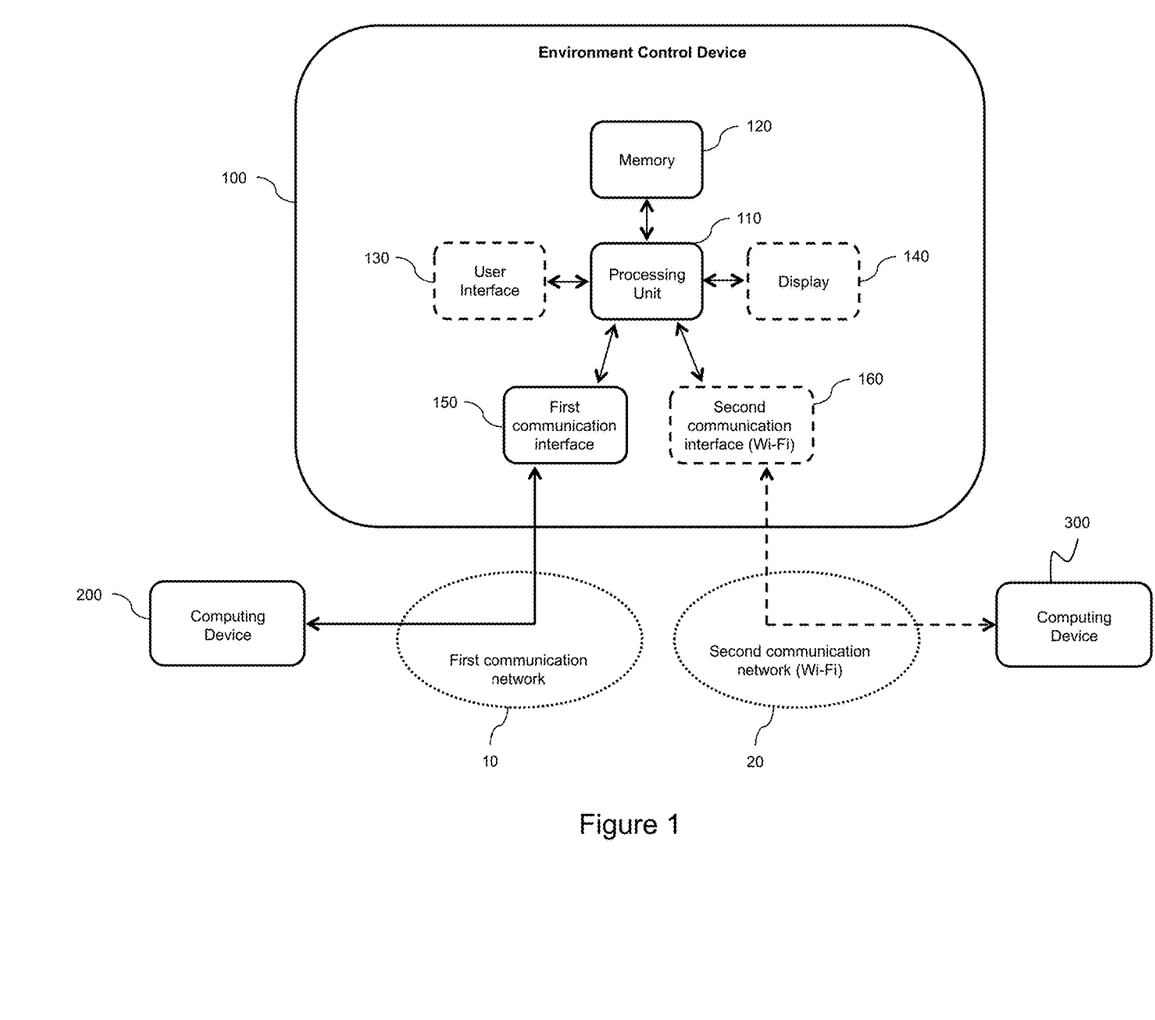
FIG. 1 illustrates an environment control device (ECD)

The ECD 100 comprises a processing unit 110, a memory 120, optionally a user interface 130, optionally a display 140, a first communication interface 150, and a second communication interface 160 of the Wi-Fi type.

The processing unit 110 has one or more processors (not represented in FIG. 1) capable of executing instructions of a computer program. Each processor may further have one or several cores.

The memory 120 stores instructions of computer program(s) executed by the processing unit 110, data generated by the execution of the computer program(s), data received via the communication interfaces 140 and 150, etc. Only a single memory 120 is represented in FIG. 1, but the ECD 100 may comprise several types of memories, including volatile memory (such as a volatile Random Access Memory (RAM)) and non-volatile memory (such as a hard drive).

The first communication interface 150 allows the ECD 100 to exchange data with computing devices 200 (only one is represented in FIG. 1 for simplification purposes) over a first communication network 10. The first communication network 10 may consist of one of the following: an Ethernet network, a Wi-Fi network, a cellular network, etc. The first communication interface 150 is adapted to support communication protocols used to exchange data over the first communication network 10.

The second communication interface 160 (of the Wi-Fi type) allows the ECD 100 to exchange data with computing devices 300 (only one is represented in FIG. 1 for simplification purposes) over a second communication network 20. The second communication network 10 is a Wi-Fi network. The second communication interface 160 is adapted to support communication protocols used to exchange data over the Wi-Fi network 20.

Figure 2:
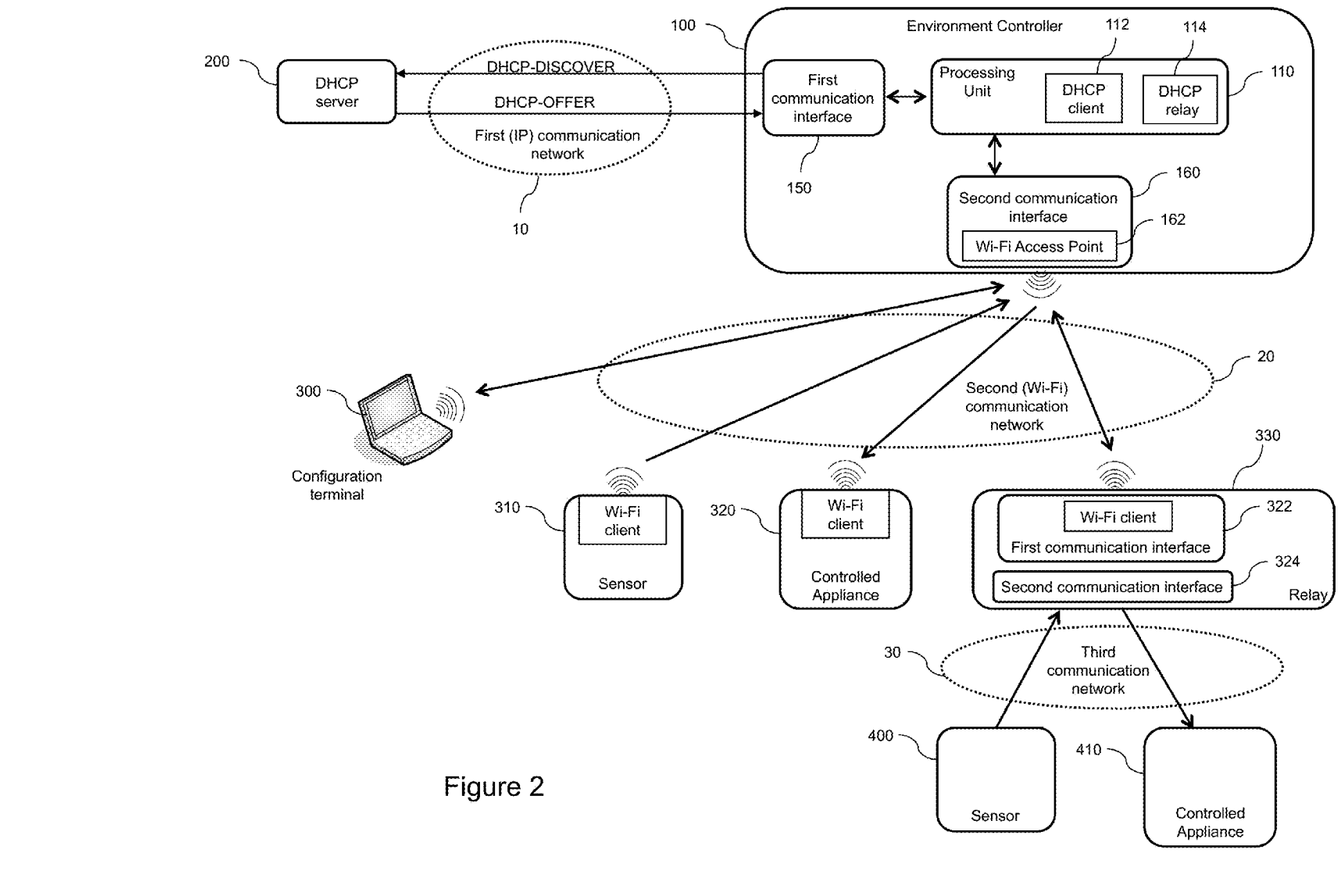
FIG. 2 illustrates the ECD of FIG. 1 configured to operate a Wi-Fi communication interface as a Wi-Fi Access Point.
Figure 3:
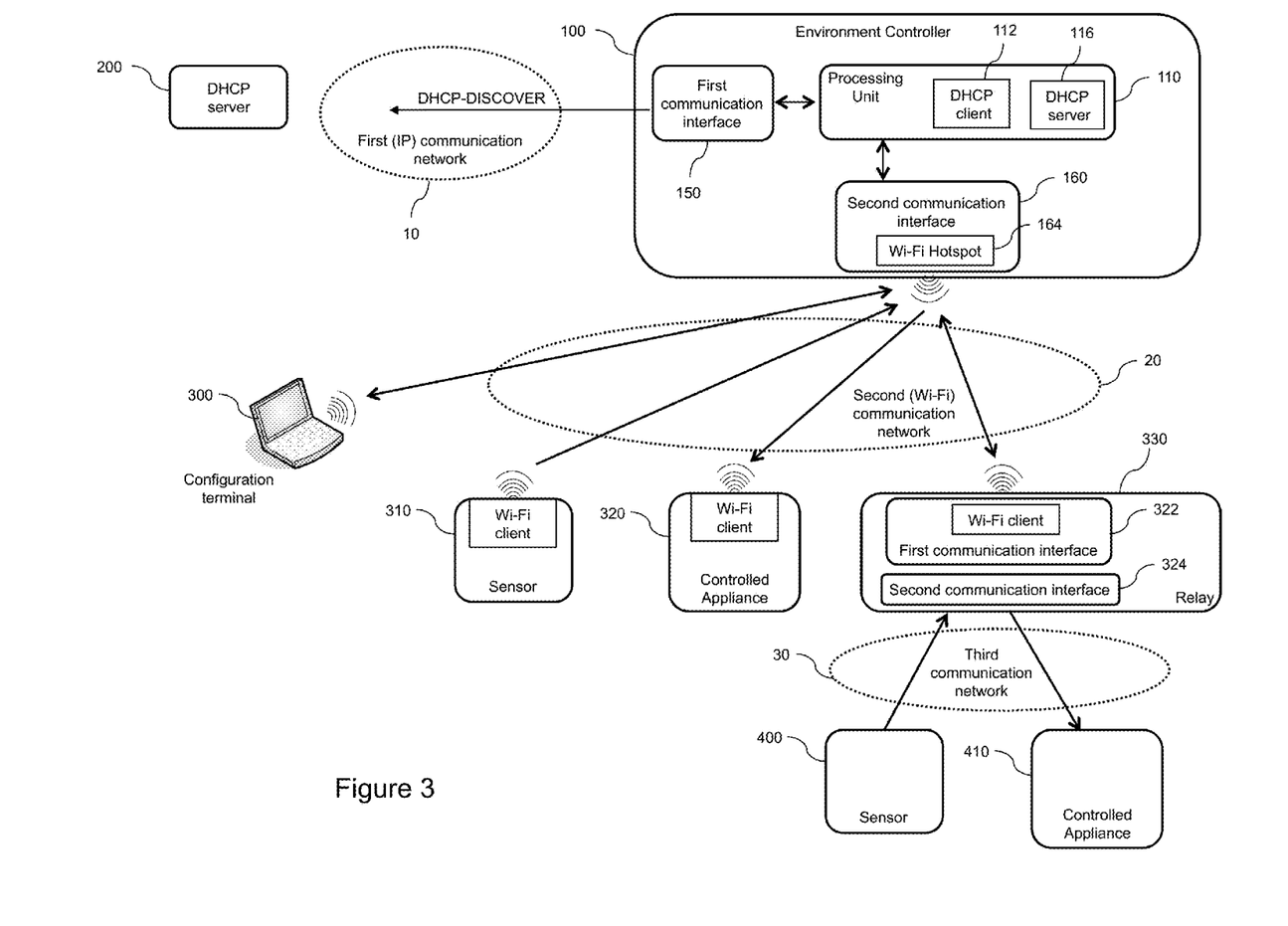
FIG. 3 illustrates the ECD of FIG. 1 configured to operate a Wi-Fi communication interface as a Wi-Fi hotspot.

The method 500, implemented by the ECD 100, configures the ECD 100 to operate the second (Wi-Fi) communication interface 160 as either one of a Wi-Fi Access Point (illustrated in FIG. 2) or a Wi-Fi hotspot (illustrated in FIG. 3).

Figure 4:
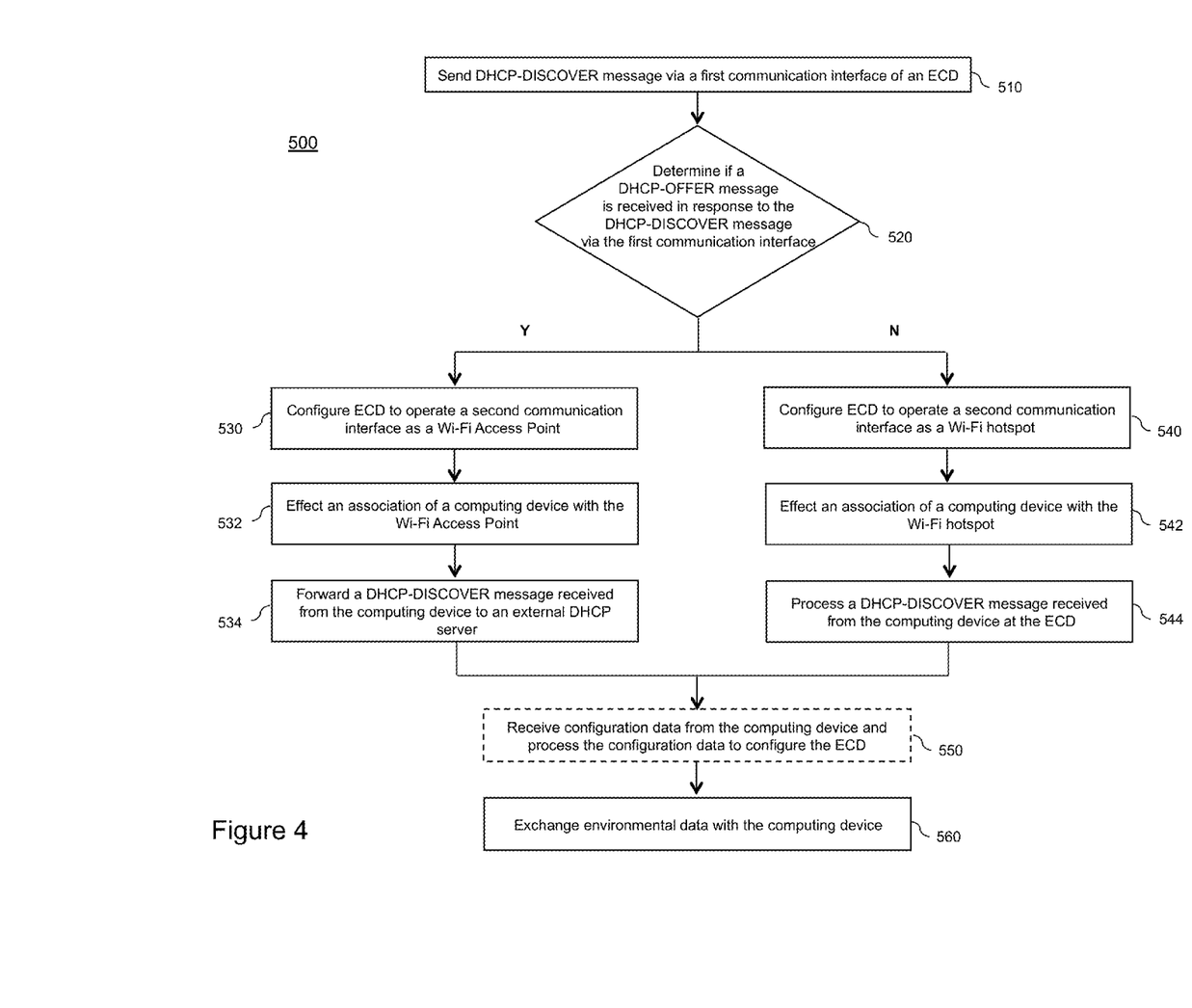
FIG. 4 illustrates a method for configuring the ECD of FIG. 1 to operate a Wi-Fi communication interface as a Wi-Fi Access Point or a Wi-Fi hotspot.

Furthermore, a specific computer program may have instructions for implementing at least some of the steps of the method 500. The instructions are comprised in a computer program product (e.g. the memory 120). The instructions provide for configuring the ECD 100 to operate the second (Wi-Fi) communication interface 160, when executed by the processing unit 110 of the ECD 100. The instructions are deliverable via an electronically-readable media such as a storage media (e.g. CD-ROM, USB key, etc.) or via communication links (e.g. first communication network 10) through the first communication interface 150.

The method 500 comprises the step 510 of sending by the processing unit 110 of the ECD 100 a DHCP-DISCOVER message via the first communication interface 150 of the ECD 100.

The DHCP-DISCOVER message is the first of a four steps handshake between a DHCP client software 112 executed by the processing unit 110 and a DHCP server 200 reachable via the first communication network 10. The first communication network 10 supports IP based networking since the DHCP protocol is based on the IP networking protocol. The DHCP protocol is well known in the art, and comprises the following four steps: DHCP-DISCOVER message from the DHCP client 112 to the DHCP server 200 (requesting an IP address), DHCP-OFFER message (proposing an IP address) from the DHCP server 200 to the DHCP client 112, DHCP-REQUEST message (requesting the proposed IP address) from the DHCP client 112 to the DHCP server 200), and DHCP-ACK message (confirming the allocation of the proposed IP address) from the DHCP server 200 to the DHCP client 112. These four messages are used in the context of an allocation of an IPv4 address. In the case of an allocation of an IPv6 address, a similar four steps handshake between the DHCP client software 112 and the DHCP server 200 also occurs, but with the following messages: DHCP-SOLICIT (in place of DHCP-DISCOVER), DHCP-ADVERTISE (in place of DHCP-OFFER), DHCP-REQUEST, and DHCP-CONFIRM (in place of DHCP-AC).

If the first communication interface 150 is connected to the first communication network 10 (as illustrated in FIG. 2), the DHCP-DISCOVER message reaches the DHCP server 200, which sends a DHCP-OFFER message in response to the DHCP-DISCOVER message. The DHCP-OFFER message is received via the first communication interface 150 and processed by the DHCP client 12 of the processing unit 110.

If the first communication interface 150 is not connected to the first communication network 10 (as illustrated in FIG. 3), the DHCP-DISCOVER message does not reach the DHCP server 200, which does not send a DHCP-OFFER message in response to the DHCP-DISCOVER message. No DHCP-OFFER message is received via the first communication interface 150 and processed by the DHCP client 12 of the processing unit 110.

The method 500 comprises the step 520 of determining by the processing unit 110 if a DHCP-OFFER message is received or not (via the first communication interface 150) in response to the DHCP-DISCOVER message of step 510. For instance, the processing unit 110 waits for a pre-determined amount of time after the DHCP-DISCOVER message is sent at step 510, and if no corresponding DHCP-OFFER message is received at the end of the pre-determined amount of time, the processing unit 110 proceeds to step 540 of the method 500. Otherwise, the processing unit 110 proceeds to step 530 of the method 500.

Configuration in Wi-Fi Access Point

The method 500 comprises the step 530 of configuring the ECD 100 by the processing unit 110 to operate the second (Wi-Fi) communication interface 160 of the ECD 100 as a Wi-Fi Access Point 162 (illustrated in FIG. 2), if a DHCP-OFFER message is received (via the first communication interface 150) at step 520 in response to the DHCP-DISCOVER message sent at step 510. The Wi-Fi Access Point 162 establishes the second (Wi-Fi) communication network 20.

Although not represented in the Figures for simplification purposes, the DHCP client 112 completes the third step (sending a DHCP-REQUEST message) and the fourth step (receiving a DHCP-ACK message) of the four steps handshake with the DHCP server 200. The DHCP-OFFER message contains an IP address proposed to the DHCP client 12 by the DHCP server 200, which is confirmed with the DHCP-REQUEST and DHCP-ACK messages.

Thus, configuring the ECD 100 to operate the second (Wi-Fi) communication interface 160 as a Wi-Fi Access Point 162 comprises configuring the second (Wi-Fi) communication interface 160 with the IP address contained in the DHCP-OFFER message.

Configuring the ECD 100 to operate the second (Wi-Fi) communication interface 160 as a Wi-Fi Access Point 162 also comprises implementing a DHCP relay functionality 114 (illustrated in FIG. 2) by the processing unit 110.

The method 500 comprises the step 532 of effecting an association of a computing device with the Wi-Fi Access Point 162. The computing device may consist of a configuration terminal 300, another ECD (e.g. a sensor 310, a controlled appliance 320 or a relay 330), etc. The computing device comprises a Wi-Fi communication interface (not represented in the Figures for simplification purposes), and implements a Wi-Fi client functionality for associating with the Wi-Fi Access Point 162 and exchanging data with other computing device(s) over the second (Wi-Fi) communication network 20.

The method 500 comprises the step 534 of performing the DHCP relay functionality 114 for a computing device (e.g. 300, 310, 320 or 330) which has associated with the Wi-Fi Access Point 162 at step 532. More precisely, the DHCP relay functionality 114 of the processing unit 110 receives a DHCP-DISCOVER message (not represented in FIG. 2 for simplification purposes) from the computing device via the second (Wi-Fi) communication interface 160. The DHCP relay functionality 114 forwards the DHCP-DISCOVER message through the first communication interface 150 to the DHCP server 200. The DHCP relay functionality 114 receives a DHCP-OFFER message in response to the DHCP-DISCOVER message via the first communication interface 150. The DHCP-OFFER message comprises an IP address allocated to the computing device. The DHCP relay functionality 114 forwards the DHCP-OFFER message to the computing device through the second (Wi-Fi) communication interface 160. The computing device (e.g. 300, 310, 320 or 330) configures its Wi-Fi communication interface with the allocated IP address.

Although not mentioned in the previous paragraph for simplification purposes, a DHCP-REQUEST message (requesting the allocated IP address) from the computing device to the DHCP server 200 is relayed by the DHCP relay functionality 114 and a DHCP-ACK message (confirming the allocation of the IP address) from the DHCP server 200 to the computing device is relayed by the DHCP relay functionality 114, before configuring the Wi-Fi communication interface of the computing device (e.g. 300, 310, 320 or 330) with the allocated IP address. Furthermore, as is well known in the art, the environment controller 100 plays the role of default IP gateway for the computing devices on the second Wi-Fi communication network 20.

Configuration in Wi-Fi Hotspot

The method 500 comprises the step 540 of configuring the ECD 100 by the processing unit 110 to operate the second (Wi-Fi) communication interface 160 of the ECD 100 as a Wi-Fi hotspot 164 (illustrated in FIG. 3), if no DHCP-OFFER message is received (via the first communication interface 150) at step 520 in response to the DHCP-DISCOVER message sent at step 510. The Wi-Fi hotspot 164 establishes the second (Wi-Fi) communication network 20.

Configuring the ECD 100 to operate the second (Wi-Fi) communication interface 160 as a Wi-Fi hotspot 164 comprises configuring the second (Wi-Fi) communication interface 160 with an IP address determined by the ECD 100 itself (more particularly by its processing unit 110), since no IP address has been received via a DHCP-OFFER message from the DHCP server 200.

Configuring the ECD 100 to operate the second (Wi-Fi) communication interface 160 as a Wi-Fi Access Point 162 also comprises implementing a DHCP server functionality 116 (illustrated in FIG. 3) by the processing unit 110.

The method 500 comprises the step 542 of effecting an association of a computing device with the Wi-Fi hotspot 164. As mentioned previously, the computing device may consist of a configuration terminal 300, another ECD (e.g. a sensor 310, a controlled appliance 320 or a relay 330), etc. The computing device comprises a Wi-Fi communication interface (not represented in the Figures for simplification purposes), and implements a Wi-Fi client functionality for associating with the Wi-Fi hotspot 164 and exchanging data with other computing device(s) over the second (Wi-Fi) communication network 20.

In this Wi-Fi hotspot mode, the environment controller 100 manages an independent IP sub-network (the second Wi-Fi communication network 20), using the DHCP server functionality 116 to allocate IP addresses to the computing devices associated with the Wi-Fi hotspot 164.

The method 500 comprises the step 544 of performing the DHCP server functionality 116 for a computing device (e.g. 300, 310, 320 or 330) which has associated with the Wi-Fi hotspot 164 at step 542. More precisely, the DHCP server functionality 116 of the processing unit 110 receives a DHCP-DISCOVER message (not represented in FIG. 3 for simplification purposes) from the computing device via the second (Wi-Fi) communication interface 160. The DHCP server functionality 116 processes the received DHCP-DISCOVER message, and does not forward it to an external DHCP server (e.g. 200). The DHCP server functionality 116 generates a DHCP-OFFER message in response to the DHCP-DISCOVER message. The DHCP-OFFER message comprises an IP address allocated to the computing device. The DHCP server functionality 116 transmits the DHCP-OFFER message to the computing device through the second (Wi-Fi) communication interface 160. The computing device (e.g. 300, 310, 320 or 330) configures its Wi-Fi communication interface with the allocated IP address.

Although not mentioned in the previous paragraph for simplification purposes, a DHCP-REQUEST message (requesting the allocated IP address) from the computing device to the DHCP server functionality 116 and a DHCP-ACK message (confirming the allocation of the IP address) from the DHCP server functionality 116 to the computing device are also exchanged, before configuring the Wi-Fi communication interface of the computing device (e.g. 300, 310, 320 or 330) with the allocated IP address. Furthermore, as is well known in the art, the DHCP server functionality 116 also indicates (via the DHCP messages) to the computing device a subnet mask (corresponding to the independent IP sub-network managed by the environment controller 100) and that the environment controller 100 is their default IP gateway.

The ECD 100 has the capability to operate the second (Wi-Fi) communication interface 160 as either a Wi-Fi Access Point 162 (illustrated in FIG. 2) or a Wi-Fi hotspot 164 (illustrated in FIG. 3), and it is configured according to the method 500 to operate in one of the two possible configurations (162 or 164). Similarly, the processing unit 110 has the capability to implement either a DHCP relay functionality 114 (illustrated in FIG. 2) or a DHCP server functionality 116 (illustrated in FIG. 3), and it is configured according to the method 500 to operate in one of the two possible configurations (114 or 116).

After the ECD 100 has performed either steps 530, 532 and 534, or alternatively steps 540, 542 and 544 of the method 500, the computing device (e.g. 300, 310, 320 or 330) is capable of exchanging data with the ECD 100 through the second (Wi-Fi) communication network 20.

The method 500 may comprise the optional step 550 of receiving configuration data by the processing unit 110 from the configuration terminal 300 (e.g. a laptop, a tablet, a smartphone, etc.) via the second (Wi-Fi) communication interface 160, and processing by the processing unit 110 the configuration data to configure the ECD 100. The configuration data are not related to the operation of the second (Wi-Fi) communication interface 160 as a Wi-Fi Access Point of a Wi-Fi hotspot, but are generally related to environment control functionalities implemented by the ECD.

In a similar manner, the configuration terminal 300 can also configure environment control functionalities of other ECDs (e.g. the sensor 310, the controlled appliance 320 or the relay 330) connected to the second (Wi-Fi) communication network 20 via one of the Wi-Fi Access Point 162 or the Wi-Fi hotspot 164.

The method 500 comprises the step 560 of exchanging environmental data by the processing unit 110 with another ECD 300 (e.g. the sensor 310, the controlled appliances 320 or the relay 330) via the second (Wi-Fi) communication interface 160.

In a particular aspect, the ECD 100 consists of an environment controller as illustrated in FIGS. 2 and 3. The processing unit 110 of the environment controller 100 receives an environmental characteristic value from one of the sensor 310 or the relay 330 via the second (Wi-Fi) communication interface 160. The processing unit 110 determines an environmental state based on the environmental characteristic value. Then, the processing unit 110 generates a command based on the environmental state, and transmits the command to one of the controlled appliance 320 or the relay 330 via the second (Wi-Fi) communication interface 160.

In this particular aspect, the relay 330 is capable of relaying an environmental characteristic value from the sensor 400 to the environment controller 100 and/or relaying a command from the environment controller 100 to a controlled appliance 410. A third communication network 30 for exchanging the environmental characteristic values with the sensor 400 and/or the commands with controlled appliance 410 may consist of an Ethernet network, a proprietary fixed network, etc. A second communication interface 324 of the relay 330 is adapted to support communication protocols used to exchange data over the third communication network 30. A first communication interface 322 of the relay 330 implements a Wi-Fi client for associating with one of the Wi-Fi Access Point 162 or the Wi-Fi hotspot 164.

In another particular aspect, the ECD implementing the method 500 consists of the relay 330 as illustrated in FIGS. 2 and 3. The first communication interface 322 of the relay 330 may consist of a Wi-Fi communication interface implementing a Wi-Fi client (as illustrated in FIGS. 2 and 3) for associating with one of the Wi-Fi Access Point 162 or the Wi-Fi hotspot 164 of the environment controller 100. Alternatively, the first communication interface 322 of the relay 330 may consist of an Ethernet interface connected to the first communication network 10, for exchanging data with the environment controller 100 via its first communication interface 150. The second communication interface 324 of the relay 330 consists of a Wi-Fi communication interface capable of implementing one of a Wi-Fi Access Point or a Wi-Fi hotspot for exchanging data with the sensor 400 and/or the controlled appliance 410 though the third (Wi-Fi) communication network 30. The relay 330 also comprises a processing unit (not represented in the Figures for simplification purposes).

The relay 330 implements all the steps of the method 500 in a manner similar to the environment controller 100. The first communication interface 322, the second communication interface 324 and the processing unit of the relay 330 play the same role as the first communication interface 150, the second communication interface 160 and the processing unit 110 of the environment controller 100 for implementing the method 500. Similarly, the sensor 400 and the controlled appliance 410 play the same role with respect to the relay 330, as the configuration terminal 300, the sensor 310, the controlled appliance 320 and the relay 330 with respect to the environment controller 100 for implementing the method 500.

The processing unit of the relay 330 performs at least one of the following: receiving an environmental characteristic value from the sensor 400 via the second communication interface 324 and transmitting the environmental characteristic value to the environment controller 100 via the first communication interface 322, or receiving a command from the environment controller 100 via the first communication interface 322 and transmitting the command to the controlled appliance 410 via the second communication interface 324.

Although a single sensor 400 and a single controlled appliance 410 are represented in FIGS. 2 and 3, a plurality of sensors and/or a plurality of controlled appliances may be connected to the third communication network 30. A configuration terminal 300 may also be connected to the third communication network 30. Similarly, although a single sensor 310, a single controlled appliance 320 and a single relay 330 are represented in FIGS. 2 and 3, a plurality of sensors and/or a plurality of controlled appliances and/or a plurality of relays may be connected to the second communication network 20. One or more additional environment controllers may also be connected to the first communication network 10. Alternatively or complementarily, one or more additional environment controllers may also be connected to the second communication network 20. One of the plurality of environment controllers may play the role of a master environment controller, controlling the operation of the other environment controllers.

In still another particular aspect, the ECD 100 implementing the method 500 comprises a USB controller (not represented in the Figures) for receiving a USB key implementing the second (Wi-Fi) communication interface 160. USB keys having Wi-Fi communication capabilities are well known in the art. As described previously, the ECD 100 is configured to operate the second (Wi-Fi) communication interface implemented by the USB key as either one of a Wi-Fi Access Point 162 or a Wi-Fi hotspot 164, as per the steps of the method 500.

Furthermore, the USB key may comprise configuration data for configuring at least one of the Wi-Fi Access Point 162 and the Wi-Fi hotspot 164. For instance, the configuration data comprise at least one of a Service Set Identifier (SSID), an encryption standard (e.g. Wired Equivalent Privacy (WEP), Wi-Fi Protected Access (WPA), WPA2, etc.), and a password. The SSID, encryption standard and password are used (as is well known in the art) by the Wi-Fi Access Point 162 and the Wi-Fi hotspot 164 for allowing a computing device (e.g. 300, 310, 320, 330) to associate with the Wi-Fi Access Point 162 or Wi-Fi hotspot 164. In alternative embodiment, the configuration data (e.g. SSID, encryption standard and password) are stored in the memory 120 of the ECD 100. Similarly, the other ECDs (e.g. sensor 310, controlled appliance 320 and relay 330) may store their Wi-Fi configuration data (e.g. SSID, encryption standard and password) for associating with one of the Wi-Fi Access Point 162 or the Wi-Fi hotspot 164 in a memory (not represented in the Figures). The association procedure for associating with either one of the Wi-Fi Access Point 162 or the Wi-Fi hotspot 164 is similar. However, as detailed previously, the acquisition of an IP address (via the DHCP protocol) is different when the ECD 100 implements one of the Wi-Fi Access Point 162 or the Wi-Fi hotspot 164.

The ECD 100 implementing the method 500 and comprising the USB controller for receiving the USB key implementing the second (Wi-Fi) communication interface 160 may consist in the environment controller 100 represented in FIGS. 2 and 3. The ECD 100 implementing the method 500 and comprising the USB controller may also consist of the relay 330 represented in FIGS. 2 and 3.

In a first use case, a technician is deploying an environment control system comprising an environment controller 100 in a building having an existing IP communication network 10, for example an Ethernet based IP network comprising a DHCP server 200. The technician powers up the environment controller 100 and connects the first communication interface 150 of the environment controller 100 to the IP communication network 10 (e.g. plugs an Ethernet cable in the first (Ethernet) communication interface 150 and in a router of the IP communication network 10). The environment controller 100 executes the method 500 and configures the environment controller 100 to operate its second (Wi-Fi) communication interface 160 as a Wi-Fi Access Point 162 providing the second (Wi-Fi) communication network 20. The execution of the method 500 may be triggered by the power up of the environment controller 100 or via a user interface 130 of the environment controller 100 (e.g. pressing an auto-configuration button). As mentioned previously, the execution of the method 500 may also be triggered by the insertion of a USB key implementing the second (Wi-Fi) communication interface 160 in a USB controller of the environment controller 100. The technician can then associate a configuration terminal 300 with the Wi-Fi Access Point 162 and receive an IP address from the DHCP server 200. The configuration terminal 300 of the technician is capable of communicating with other ECDs (e.g. sensor 310, controlled appliance 320 and relay 330) also connected to the second (Wi-Fi) communication network 20 through the Wi-Fi Access Point 162, and configuring these other ECDs. The configuration terminal 300 of the technician is also capable of communicating with other computing devices connected to the IP communication network 10, for example other environment controllers connected to the IP communication network 10 in a similar manner as the environment controller 100. These other environment controllers can be configured by the configuration terminal 300 via their respective first communication interface 150 connected to the IP communication network 10 (the environment controller 100 acts as a relay (from an IP networking perspective) between the configuration terminal 300 and the other environment controllers).

In a second use case, the technician is deploying the environment control system comprising the environment controller 100 in another building having an existing IP communication network 10, for example an Ethernet based IP network comprising a DHCP server 200. However, for some reasons, the technician is not capable of, or not allowed to, connect the environment controller 100 to the IP communication network 10. The technician powers up the environment controller 100, but he does not connect the first communication interface 150 of the environment controller 100 to the IP communication network 10. The environment controller 100 executes the method 500 and configures the environment controller 100 to operate its second (Wi-Fi) communication interface 160 as a Wi-Fi hotspot 164 providing the second (Wi-Fi) communication network 20. The technician can then associate a configuration terminal 300 with the Wi-Fi hotspot 164 and receive an IP address from the DHCP server 116 implemented by the environment controller 100. The configuration terminal 300 of the technician is capable of communicating with other ECDs (e.g. sensor 310, controlled appliance 320 and relay 330) also connected to the second (Wi-Fi) communication network 20 through the Wi-Fi hotspot 164, and configuring these other ECDs. The configuration terminal 300 of the technician is not capable of communicating with other computing devices connected to the IP communication network 10.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller, comprising:
a first communication interface;
a second communication interface of the Wi-Fi type; and
a processing unit for:
sending a Dynamic Host Configuration Protocol-DISCOVER (DHCP-DISCOVER) message via the first communication interface;
configuring the environment controller to operate the second communication interface as a Wi-Fi Access Point if a Dynamic Host Configuration Protocol-OFFER (DHCP-OFFER) message is received in response to the DHCP-DISCOVER message via the first communication interface;
configuring the environment controller to operate the second communication interface as a Wi-Fi hotspot if no DHCP-OFFER message is received in response to the DHCP-DISCOVER message via the first communication interface;
receiving an environmental characteristic value from one of a sensor or a relay via the second communication interface, and determining an environmental state based on the environmental characteristic value; and
generating a command based on the environmental state, and transmitting the command to one of a controlled appliance or a relay via the second communication interface.

2. The environment controller of claim 1, further comprising a USB controller for receiving a USB key implementing the second communication interface.

3. The environment controller of claim 2, wherein the USB key comprises configuration data for configuring at least one of the Wi-Fi Access Point and the Wi-Fi hotspot.

4. The environment controller of claim 3, wherein the configuration data comprise at least one of a SSID, an encryption standard, and a password.

5. The environment controller of claim 1, wherein a computing device associates with one of the operated Wi-Fi Access Point or the operated Wi-Fi hotspot, the processing unit receives configuration data from the computing device via the second communication interface, and the processing unit processes the configuration data to configure the environment controller.

6. The environment controller of claim 1, wherein the environment controller is configured to operate the second communication interface as a Wi-Fi Access Point and a computing device associates with the Wi-Fi Access Point; the processing unit receives a DHCP-DISCOVER message from the computing device via the second communication interface and forwards the DHCP-DISCOVER message through the first communication interface; and the processing unit receives a DHCP-OFFER message in response to the DHCP-DISCOVER message via the first communication interface and forwards the DHCP-OFFER message to the computing device through the second communication interface, the DHCP-OFFER message comprising an IP address allocated to the computing device.

7. The environment controller of claim 1, wherein the environment controller is configured to operate the second communication interface as a Wi-Fi hotspot and a computing device associates with the Wi-Fi hotspot; the processing unit receives a DHCP-DISCOVER message from the computing device via the second communication interface, generates a DHCP-OFFER message in response to the DHCP-DISCOVER message, and transmits the DHCP-OFFER message to the computing device through the second communication interface, the DHCP-OFFER message comprising an IP address allocated to the computing device.

8. The environment controller of claim 1, wherein the Wi-Fi hotspot provides an independent Wi-Fi based IP network managed by the environment controller.

9. The environment controller of claim 1, wherein configuring the environment controller to operate the second communication interface as a Wi-Fi Access Point comprises configuring the second communication interface with an IP address contained in the DHCP-OFFER message.

10. The environment controller of claim 1, wherein configuring the environment controller to operate the second communication interface as a Wi-Fi hotspot comprises configuring the second communication interface with an IP address determined by the environment controller.

11. A relay, comprising:
a first communication interface;
a second communication interface of the Wi-Fi type; and
a processing unit for:
sending a Dynamic Host Configuration Protocol-DISCOVER (DHCP-DISCOVER) message via the first communication interface;
configuring the relay to operate the second communication interface as a Wi-Fi Access Point if a Dynamic Host Configuration Protocol-OFFER (DHCP-OFFER) message is received in response to the DHCP-DISCOVER message via the first communication interface;
configuring the relay to operate the second communication interface as a Wi-Fi hotspot if no DHCP-OFFER message is received in response to the DHCP-DISCOVER message via the first communication interface; and
performing at least one of:
receiving an environmental characteristic value from a sensor via the second communication interface and transmitting the environmental characteristic value to an environment controller via the first communication interface; and
receiving a command from an environment controller via the first communication interface and transmitting the command to a controlled appliance via the second communication interface.

12. The relay of claim 11, further comprising a USB controller for receiving a USB key implementing the second communication interface.

13. The relay of claim 12, wherein the USB key comprises configuration data for configuring at least one of the Wi-Fi Access Point and the Wi-Fi hotspot.

14. The relay of claim 13, wherein the configuration data comprise at least one of a SSID, an encryption standard, and a password.

15. The relay of claim 11, wherein a computing device associates with one of the operated Wi-Fi Access Point or the operated Wi-Fi hotspot, the processing unit receives configuration data from the computing device via the second communication interface, and the processing unit processes the configuration data to configure the relay.

16. The relay of claim 11, wherein the relay is configured to operate the second communication interface as a Wi-Fi Access Point and a computing device associates with the Wi-Fi Access Point; the processing unit receives a DHCP-DISCOVER message from the computing device via the second communication interface and forwards the DHCP-DISCOVER message through the first communication interface; and the processing unit receives a DHCP-OFFER message in response to the DHCP-DISCOVER message via the first communication interface and forwards the DHCP-OFFER message to the computing device through the second communication interface, the DHCP-OFFER message comprising an IP address allocated to the computing device.

17. The relay of claim 11, wherein the relay is configured to operate the second communication interface as a Wi-Fi hotspot and a computing device associates with the Wi-Fi hotspot; the processing unit receives a DHCP-DISCOVER message from the computing device via the second communication interface, generates a DHCP-OFFER message in response to the DHCP-DISCOVER message, and transmits the DHCP-OFFER message to the computing device through the second communication interface, the DHCP-OFFER message comprising an IP address allocated to the computing device.

18. The relay of claim 11, wherein the Wi-Fi hotspot provides an independent Wi-Fi based IP network managed by the relay.

19. The relay of claim 11, wherein configuring the relay to operate the second communication interface as a Wi-Fi Access Point comprises configuring the second communication interface with an IP address contained in the DHCP-OFFER message.

20. The relay of claim 11, wherein configuring the relay to operate the second communication interface as a Wi-Fi hotspot comprises configuring the second communication interface with an IP address determined by the relay.

* * * * *

UNITED STATES PATENT AND TRADEMARK OFFICE
CERTIFICATE OF CORRECTION

PATENT NO. : 9,838,959 B2
APPLICATION NO. : 15/007302
DATED : December 5, 2017
INVENTOR(S) : Breton et al.

It is certified that error appears in the above-identified patent and that said Letters Patent is hereby corrected as shown below:

On the Title Page

Item (12) "Breton" should read -- Breton, et al. --.

Item (72) Inventor is corrected to read:
-- Danny Breton, Saint-Jean sur Richelieu (CA);
Francois Gervais, Lachine (CA) --.

Signed and Sealed this
Tenth Day of July, 2018

Andrei Iancu
*Director of the United States Patent and Trademark Office*